United States Patent
Wesson

(10) Patent No.: US 6,442,806 B1
(45) Date of Patent: Sep. 3, 2002

(54) FASTENING DEVICE WITH NON-REVERSIBLE SLIDE-ON HEADS

(75) Inventor: Bob G. Wesson, Phoenix, AZ (US)

(73) Assignee: U-Haul International, Inc., Tempe, AZ (US)

( * ) Notice: Subject to any disclaimer, the term of this patent is extended or adjusted under 35 U.S.C. 154(b) by 0 days.

(21) Appl. No.: 09/535,452

(22) Filed: Mar. 24, 2000

(51) Int. Cl.[7] .......................... B65D 63/00; F16B 21/00; F16B 37/02
(52) U.S. Cl. .................. 24/573.1; 24/16 PB; 24/17 AP; 24/30.5 P; 24/573.7; 411/339; 411/510; 411/525
(58) Field of Search .................. 24/573.1, 16 PB, 24/17 AP, 30.5 P, 573.7; 411/525, 526, 508, 509, 339, 510

(56) References Cited

U.S. PATENT DOCUMENTS

| | | | | |
|---|---|---|---|---|
| 3,673,911 A | * | 7/1972 | Ramillon | 24/573.1 |
| 3,924,298 A | | 12/1975 | Merser | 24/16 |
| 4,235,404 A | | 11/1980 | Kraus | 248/74 |
| 4,454,699 A | * | 6/1984 | Strobl | 411/508 |
| 4,495,380 A | * | 1/1985 | Ryan et al. | 24/573.1 |
| 4,672,719 A | * | 6/1987 | Scott | 24/113 R |
| 4,785,563 A | * | 11/1988 | Friedman | 24/16 PB |
| 4,805,366 A | * | 2/1989 | Long | 411/339 |
| 4,867,725 A | * | 9/1989 | Smith | 411/510 |
| 5,079,804 A | | 1/1992 | Gregurich et al. | 24/17 |
| 5,117,575 A | | 6/1992 | Desmond | 43/44.8 |
| 5,269,809 A | * | 12/1993 | Hayhurst et al. | 606/232 |
| 5,520,691 A | | 5/1996 | Branch | 606/72 |
| 5,639,196 A | * | 6/1997 | Murase et al. | 411/339 |
| 5,685,682 A | * | 11/1997 | Glime et al. | 411/528 |
| 5,836,054 A | | 11/1998 | Alexander | 24/16 |
| 5,960,575 A | * | 10/1999 | Chiovitt et al. | 42/70.07 |

* cited by examiner

Primary Examiner—Victor Sakran
(74) Attorney, Agent, or Firm—Jeffer, Mangels, Butler & Marmaro LLP

(57) ABSTRACT

A fastening device including a shaft portion having first and second sections, and at least two slide-on heads each having an opening defined therethrough and being adapted to engage the first and second sections of the shaft portion. The first and second sections each include a plurality of axially aligned, outwardly oriented locking members. The locking members of the second section are oriented oppositely of the locking members of the first section.

17 Claims, 4 Drawing Sheets

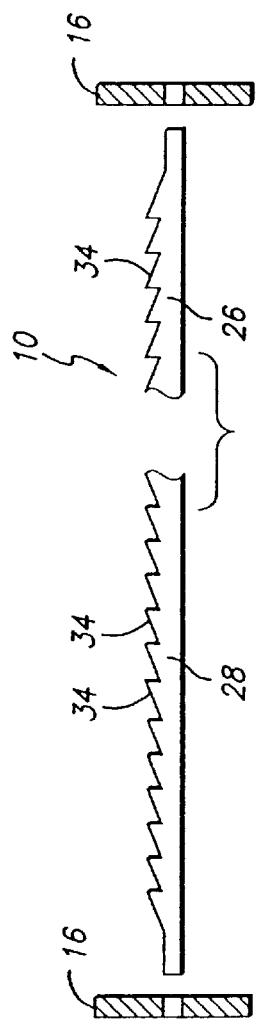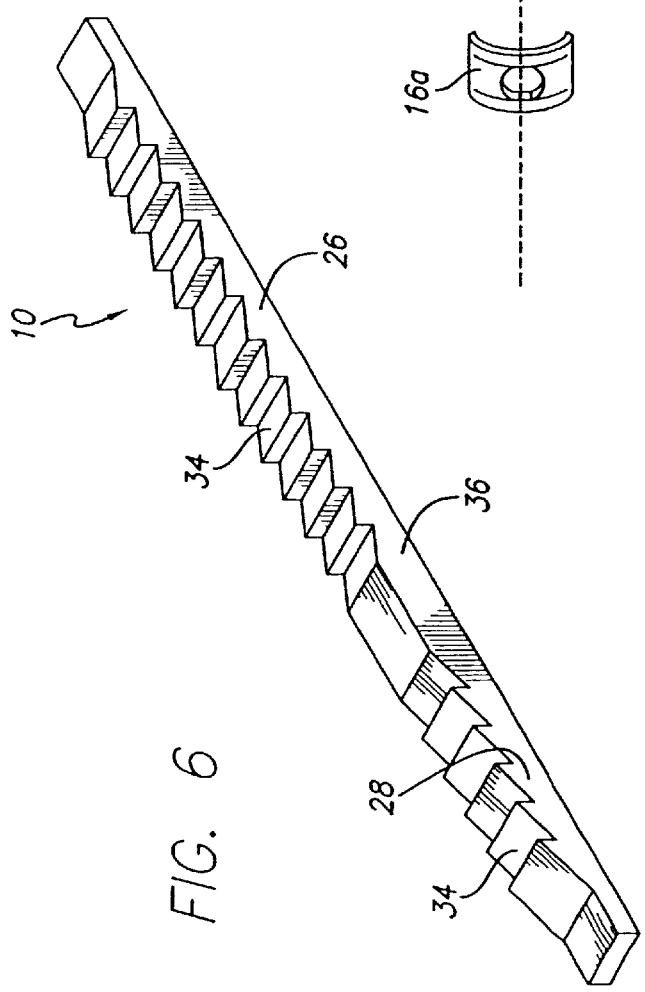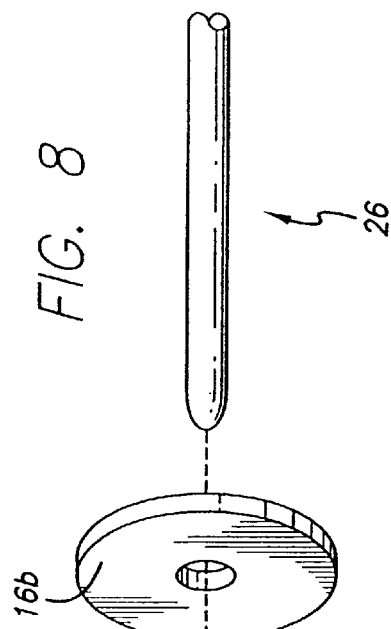

FASTENING DEVICE WITH NON-REVERSIBLE SLIDE-ON HEADS

FIELD OF THE INVENTION

The present invention relates to a fastening device, and more particularly to a fastening device with non reversible slide-on heads.

BACKGROUND OF THE INVENTION

Devices for securing one article to another that allow non-reversible insertion of a ridged shaft or the like into a locking device, such as "tie-wraps" are known. For example, as shown in FIG. 1, flexible variable-length fasteners 12 with one molded on head 14 and one slide-on head 16 are known. These fasteners 12 are commonly used to install, for example, aftermarket fluid/oil coolers to the front or rear surface of an automotive radiator. The shaft portion 18 of the fastener is small enough in outside diameter to allow insertion through the core of a typical automotive radiator, between cooling fins and tubes. The shaft portion 18 includes ridges, knobs or other locking members 20 that control movement of the slide-on head 16 directionally, allowing installation and advancing movement onto the shaft portion 18, but preventing withdrawal.

When securing a cooler to the front surface of a radiator using the fastener 12, installation is accomplished as follows: The auxiliary cooler is placed in the desired mounting position, against the surface of the radiator. The shaft portion 18 of the fastener 12 is inserted through the cooler and the radiator core until the molded on head 14 comes into contact with the cooler and a portion of the shaft 18 extends out the back side of the radiator. The slide-on head 16, which includes an opening 22 defined therethrough, is then installed onto the shaft portion 18 that is protruding through the back side of the radiator and advanced over the knobs 20 to the point of contact with the radiator, thereby securing the cooler to the radiator (typically a plurality of fasteners 12 are used).

Very often though, fastener 12 installation is complicated by accessories, such as the fan, fan shroud, coolant hoses, belts, etc., which limit access to the area behind the radiator, because once the slide-on head 16 is placed onto the shaft portion 18 it is difficult to advance the slide-on head 16 all the way to where it is in contact with the radiator.

There are other prior art devices that include a flexible shaft portion including ridges or knobs for non-reversible directional control. However, in many of these fasteners, the flexible shaft portion is inserted into a portion that is already secured to the shaft (such as the aforementioned "tie-wrap"), thereby forming a loop. For example, U.S. Pat. No. 5,117,575 to Desmond teaches a fastener that has oppositely facing conically shaped knob-sections that are flexible. The fastener has a locking device disposed on the shaft and between the two knob-sections. The opposite ends of the shaft are inserted into the locking device, thereby forming a loop. This type of fastener can not be used in some situations, such as the example above of securing a cooler to a radiator.

A long felt need exists for a fastening device that does not form a loop, is easy to install, and overcomes the other disadvantages of the prior art.

SUMMARY OF THE PREFERRED EMBODIMENTS

In accordance with a first aspect of the present invention there is provided a fastening device including a shaft portion having first and second sections and opposite ends and at least two slide-on heads each having an opening defined therethrough and being adapted to engage the first and second sections respectively. The slide-on heads are adapted to only move inwardly with respect to the opposite ends of the shaft portion. In a preferred embodiment, the first and second sections each include a plurality of axially aligned, outwardly oriented locking members. The locking members of the second section are oriented oppositely of the locking members of the first section. In another preferred embodiment, the shaft portion includes an intermediate section disposed between the first and second sections that has a dimension along its transverse axis. The opening of the slide-on heads has a width. The dimension of the intermediate section is larger than the width (dependent on geometric shape; diameter, width, etc.) of the openings.

In accordance with another aspect of the present invention there is provided a fastening device that includes a shaft portion having at least first and second opposed sections and at least two slide-on heads. The first and second sections include a discontinuous surface, whereby when the slide-on heads are placed on the shaft portion the slide-on heads can be moved readily towards each other and less readily away from each other. In a preferred embodiment, the discontinuous surface is formed by locking members that are either conically shaped or saw tooth shaped.

In accordance with yet another aspect of the present invention there is provided a method of securing a first object to a second object using a fastening device. The method includes the steps of positioning the first object adjacent the second object, installing a first slide-on head at the end of a second section of a shaft portion of the fastening device, inserting a first section of a shaft portion of the fastening device through a front side of the first and second objects such that the first section protrudes from a back side of the second object and the first slide-on head contacts the front side of the first object, installing a second slide-on head onto the first section, and then advancing the first slide-on head further onto the second section, thereby holding the first and second objects in secure contact. In a preferred embodiment, the method also includes the step of pulling a portion of the shaft portion back through the first and second objects before advancing the slide-on head onto the second section.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 5 is a side plan view of a fastening device in accordance with a second embodiment of the present invention.

FIG. 6 is a perspective view of the fastening device of FIG. 5.

FIG. 8 is a partial perspective view of a fastening device in accordance with a third embodiment of the present invention.

Like numerals refer to like parts throughout the several views of the drawings.

DETAILED DESCRIPTION OF THE PREFERRED EMBODIMENTS

Figure 2:
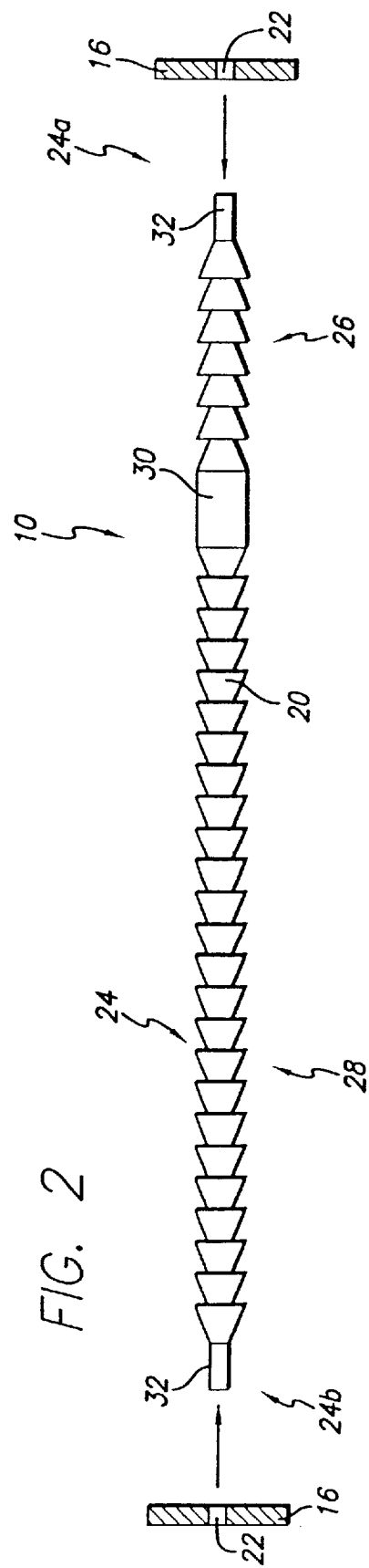
FIG. 2 is a side plan view of a fastening device with opposed slide-on heads in accordance with a first embodiment of the present invention.
Figure 3:
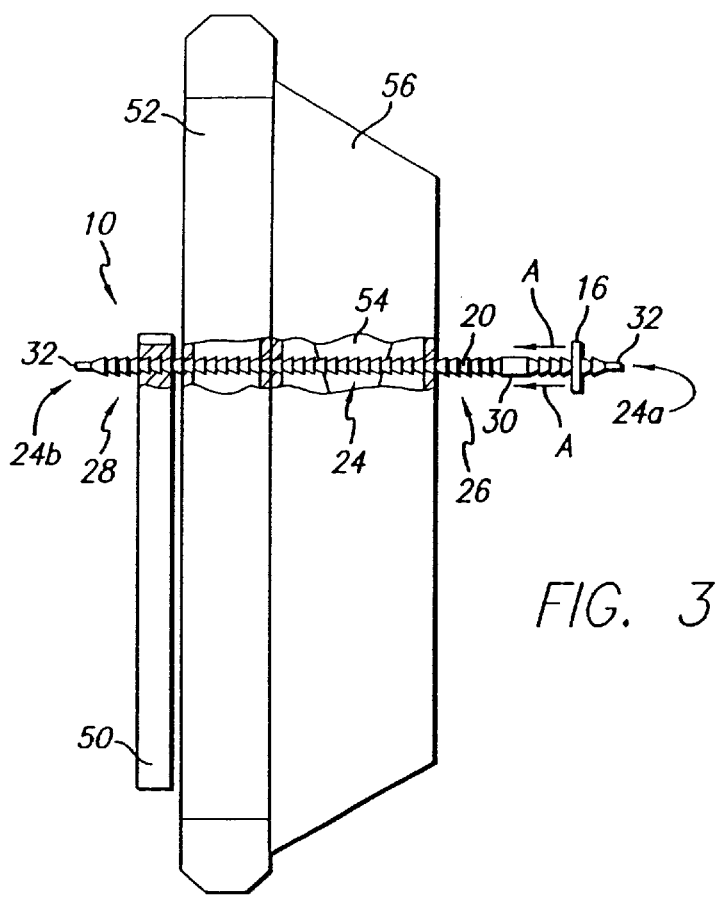
FIG. 3 is a side plan view of a radiator assembly with a portion of the assembly cut away to the show the shaft portion of the fastening device of FIG. 2 extending therethrough.
Figure 4:
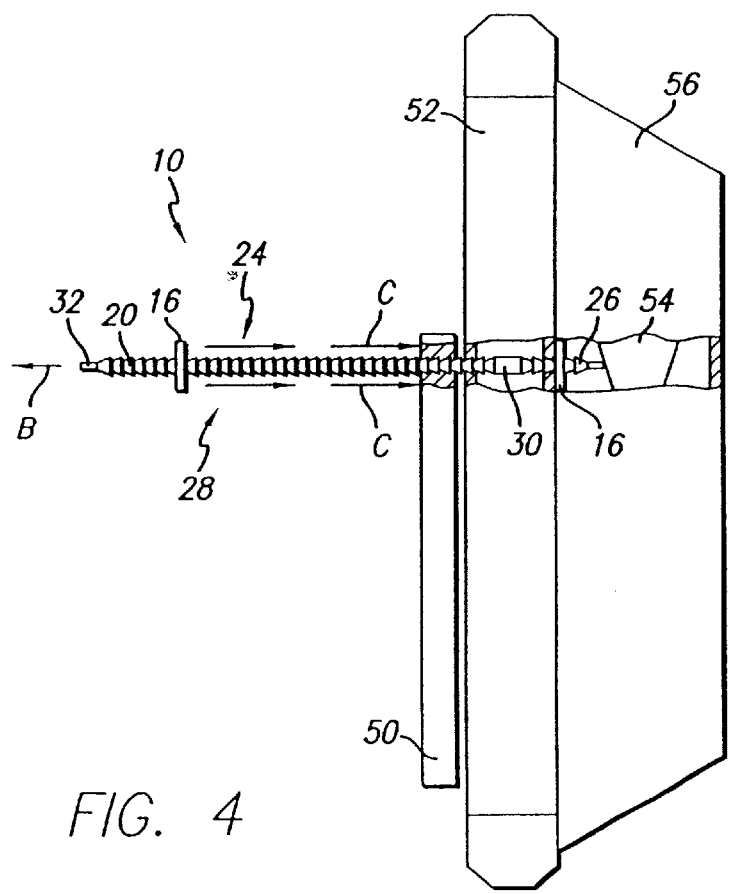
FIG. 4 is a side plan view similar to FIG. 3, but showing both slide-on heads on the shaft portion.

Referring to FIGS. 2–4, a first embodiment of a fastening device 10 is shown. For exemplary purposes only, the fastening device 10 is described herein for securing an oil cooler 50 to the front surface of an automotive radiator 52. It will be understood that those skilled in the art will be able to use the fastening device 10 for other purposes.

The fastening device 10 generally includes a shaft portion 24, and a pair of slide-on heads 16. It will be appreciated that terms such as "outwardly," "front" and "back" used herein are used merely for ease of description and refer to the orientation of the components as shown in the Figures. It should be understood that any orientation of the fastening device 10 described herein is within the scope of the present invention.

The shaft portion 24 includes first and second sections 26, 28 that are each comprised of a plurality of locking members 20. In a preferred embodiment, the locking members 20 are conically shaped such that the apex of the locking members can easily fit through the opening 22 in the slide-on head 16, and the base of the locking members must deform slightly to be pulled through the opening 22. Therefore, once the slide-on head 16 has completely passed over a locking member 20 movement in the reverse direction is resisted. To allow for easy installation of the slide-on head 16 onto the shaft portion (and over the locking members 20) the components are preferably made of a pliable material, such as nylon or other plastic.

Preferably, the locking members 20 that make up the first and second sections 26, 28 are axially aligned and are arranged such that the apex of a locking member 20 is secured to the base of an adjacent locking member 20, as shown in the Figures. The first section 26 includes locking members 20 whose apexes are oriented outwardly, such that a slide-on head can be received thereon. The second section 28 includes locking members 20 whose apexes are oriented in the opposite direction of those of the first section 26, thereby providing a shaft portion 24 having first and second opposite ends 24a, 24b on which slide-on heads 16 can be received. In a preferred embodiment, the shaft portion 24 includes an intermediate portion 30 disposed between the first and second sections 26, 28 over which a slide-on head 16 cannot fit. The shaft portion 24 can also include end members 32 onto which the slide-on head 18 can be disposed, before engaging the locking members 20. The end members 32 have a cross-sectional dimension (diameter, width, etc.) smaller than that of opening 22.

It will be understood that the locking members 20 can be any discontinuous surface, such as knobs, ridges, protrusions, notches the like that allow movement of the slide-on head 16 in one direction only. For example, in a second embodiment the locking members can be teeth 34 that are disposed on one or more sides of a polygonal shaft 36, as shown in FIGS. 5 and 6. It will be further understood that use herein of the terms cone or conically shaped does not limit the locking members 20 to having a circular cross-section (along a transverse axis). The locking members 20 may have a cross-section of any geometric shape (square, triangular, etc.), provided that each locking member 20 has an apex of smaller cross-sectional dimension than its base. Opening 22 preferably has a shape corresponding to the cross-sectional shape of the locking members 20.

In another embodiment, as shown in FIG. 8, the first or second sections 26, 28 (only the first section 26 is shown) can have smooth surfaces (the locking members can be omitted). In this embodiment, the slide-on head can be a spring clip 16a as shown in FIG. 8. It will be appreciated by one skilled in the art that the spring clip 16a is curved as shown to allow movement in one direction and prevent movement in the opposite direction. Preferably, this embodiment of the fastening device includes a washer 16b. The spring clip 16a can be molded to the washer 16b or other type of slide-on head or can be separate therefrom as shown in FIG. 8.

Figure 7:
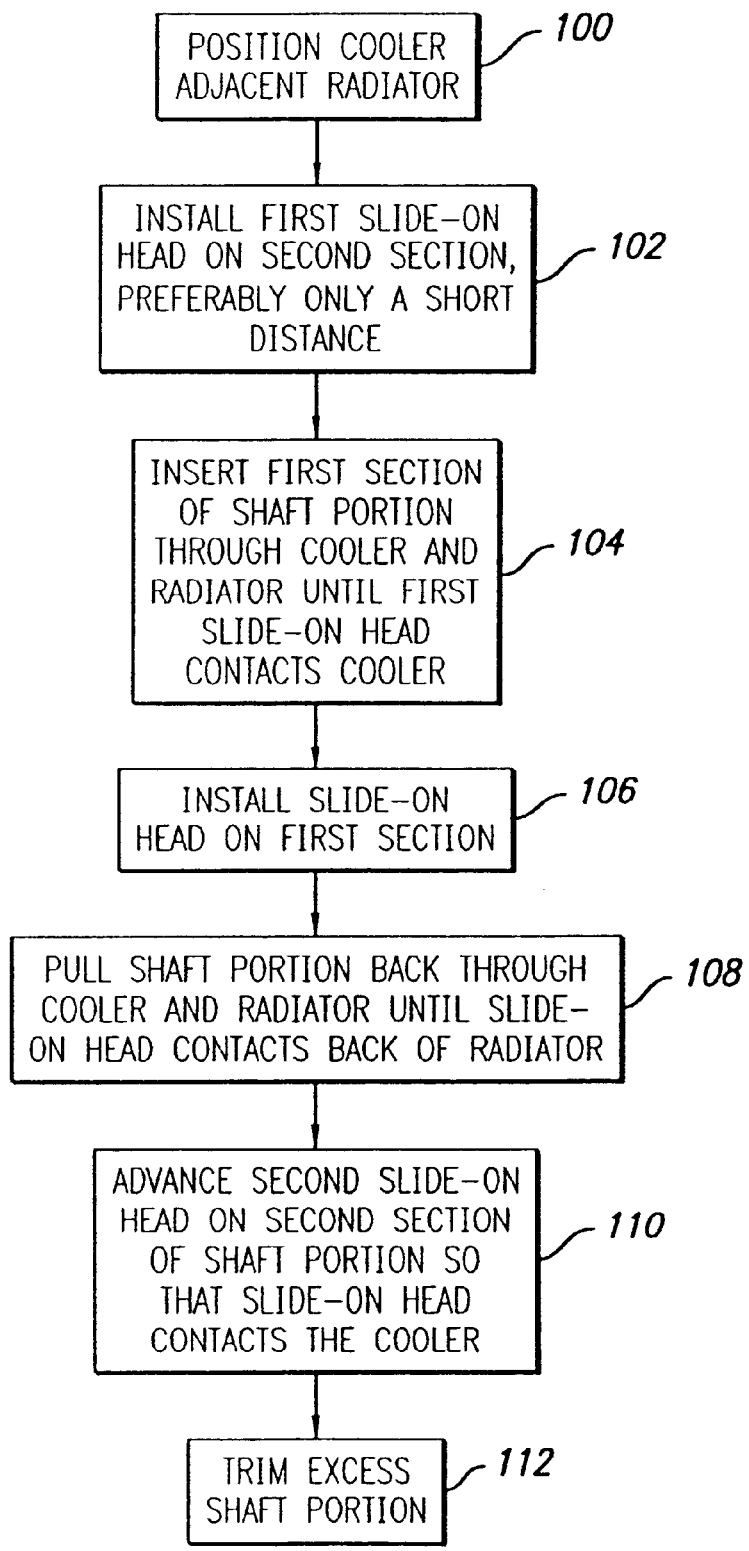
FIG. 7 is a flow chart showing the steps of securing an auxiliary cooler to a radiator using the fastening device of the present invention.

Referring to FIGS. 3–4 and 7, the method of securing a first object (an auxiliary cooler 50 is used as an example) to a second object (a radiator 52 is used as an example) using the above described fastening device 10 is described. It will be understood that the objects to be secured together are not a limitation on the present invention. Furthermore, it will be understood that the ordering of the steps is not a limitation on the present invention. The steps can be performed in any order.

Figure 1:
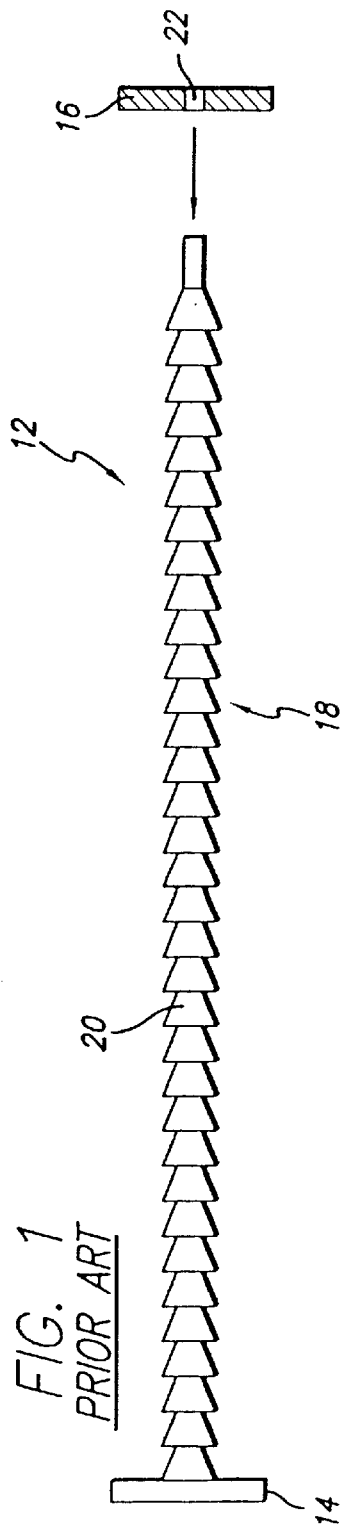
FIG. 1 is a side plan view of a prior art fastener.

First, the auxiliary cooler 50 is positioned 100 adjacent the radiator 52 in the desired position. One of the slide-on heads 16 is then installed 102 onto the second section 28 of the shaft portion 24 so that it engages at least one of the locking members 20. Next, the first section 26 of the shaft portion 24 is inserted 104 through the cooler 50 and radiator 52, such that a significant portion of the shaft portion 24 protrudes through the back of the radiator 52. If a fan 54 and/or fan shroud 56 are present on the back side of the radiator 52, the shaft portion 24 preferably protrudes outside of these items as well so that it can easily be grasped by the operator. A second slide-on head 16 is then installed 106 onto the first section 26 of the shaft portion 24 in the direction indicated by arrows A. As shown in FIG. 3, preferably the slide-on head 16 is only advanced onto the first section 26 a relatively short distance, so that the operator does not need to reach in to the area where the fan 54 is located, which is difficult to access. With the prior art fastener 12 shown in FIG. 1, the operator had to advance the slide-on head 16 all the way in to the area where the fan 54 and fan shroud 56 are.

Next, the shaft portion 24 is pulled 108 back through the radiator 52 and cooler 50 in the direction of arrow B until the first slide-on head 16 contacts the back side of the radiator 52, as shown in FIG. 4. The slide-on head 16 that was installed 102 onto the second section 28 is then advanced 110 onto the second section 28 of the shaft portion 24 along the locking members 20 in the direction of arrows C until it is in contact with the cooler 50. The excess shaft portion 24 can then be trimmed 112 off. It will be understood that the steps described above can be performed in any order. For example, the slide-on head 16 can be installed on the second section 28 after the shaft portion 24 is inserted through the radiator 52 and cooler 50.

In specific embodiments, the intermediate portion 30 can be advantageously positioned along shaft portion 24. For example, the intermediate portion 30 can be positioned such that the first section 26 includes adequate locking members 20 for installation of a slide-on head 16, but not enough locking members 20 to advance the slide-on head 16 very far along shaft portion 24. This insures that the intermediate portion 30 will be located within the thickness of the radiator 52 (as shown in FIG. 4), and will not interfere with advancement of the other slide-on head 16.

The embodiments of the present invention recited herein are intended to be merely exemplary and those skilled in the art will be able to make numerous modifications to them without departing from the spirit of the present invention. For example, the intermediate portion 30 may be omitted. More than two sections may be included. All such modifications are intended to be within the scope of the present invention as defined by the claims appended hereto.

What is claimed is:

1. A fastening device, comprising:
    a shaft portion having first and second sections and opposite ends;
    at least two slide-on heads each having an opening defined therethrough and being adapted to engage said first and second sections respectively, whereby said slide-on heads are adapted to only move inwardly with respect to said opposite ends of said shaft portion; and
    wherein said first section includes a plurality of axially aligned, outwardly oriented locking members, and said second section includes a plurality of axially aligned, outwardly oriented locking members, said locking members of said second section being oriented oppositely of said locking members of said first section.

2. The fastening device of claim 1 wherein said shaft portion further comprises an intermediate section disposed between said first and second sections.

3. The fastening device of claim 2 wherein said intermediate section has a dimension along its transverse axis and said opening of each of said slide-on heads has a width, and wherein said dimension is larger than said width.

4. The fastening device of claim 1 wherein said opposite ends of said shaft portion each have an end member associated therewith.

5. The fastening device of claim 1 wherein said second section includes more locking members than said first section.

6. The fastening device of claim 1 wherein said locking members include a base and an apex, wherein said base has a larger cross-sectional dimension than said apex.

7. The fastening device of claim 1 wherein said shaft portion further comprises an intermediate section disposed between said first and second sections, wherein said locking members include a base and an apex, wherein said base has a larger cross-sectional dimension than said apex, wherein the cross-sectional dimension of said intermediate section is not larger than said cross-sectional dimension of said base of said locking members.

8. The fastening device of claim 1 wherein said shaft portion further comprises an intermediate section disposed between said first and second sections, and wherein the cross-sectional dimension of said intermediate section is not larger than the cross-sectional dimension of said first and second sections.

9. A fastening device comprising a shaft portion having at least first and second opposed sections, first and second opposed ends, and at least two slide-on heads, said first and second sections including a plurality of locking members that form a discontinuous surface, wherein said locking members of said first and second sections are oriented outwardly with respect to said first and second ends, and whereby when said slide-on heads are placed upon said shaft portion said slide-on heads can be moved readily towards each other and less readily away from each other.

10. The fastening device of claim 9 wherein said shaft portion includes first and second sections each comprised of a plurality of said locking members terminating in one of said first and second ends respectively.

11. The fastening device of claim 9 wherein said shaft portion includes an intermediate section spaced between said first and second opposite ends.

12. The fastening device of claim 9 wherein said locking members are conically-shaped.

13. The fastening device of claim 9 wherein said locking members are teeth.

14. A method of securing a first object to a second object using a fastening device having a shaft portion with a first section and a second section, said method comprising the steps of:
    (a) positioning said first object adjacent said second object,
    (b) installing a first slide-on head onto the second section of said shaft portion,
    (c) inserting the first section of the shaft portion of said fastening device through a front side of said first and second objects such that said first section protrudes from a back side of said second object, and
    (d) installing a second slide-on head onto said first section.

15. The method of claim 14 further comprising the step of pulling a portion of said shaft portion back through said first and second objects after step (d).

16. The method of claim 14 further comprising the step of advancing said first slide-on head on said second section such that said second slide-on head contacts said first object.

17. An assembly comprising:
    (a) a first object having an opening defined therein,
    (b) a second object having an opening defined therein,
    (c) a fastening device comprising:
        (i) a shaft portion having first and second sections and opposite ends, and
        (ii) first and second slide-on heads each having an opening defined therethrough and being adapted to engage said first and second sections respectively, wherein said slide-on heads are adapted to only move inwardly with respect to said opposite ends of said shaft portion,
    wherein said first section extends through said opening in said first object and said second end extends through said opening in said second object, and wherein said first and second slide-on heads are received on said first and second sections outboard of said first and second objects.

* * * * *